United States Patent
Kim

(10) Patent No.: US 7,887,952 B2
(45) Date of Patent: Feb. 15, 2011

(54) SECONDARY BATTERY

(75) Inventor: Yong-Sam Kim, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 172 days.

(21) Appl. No.: 11/154,567

(22) Filed: Jun. 17, 2005

(65) Prior Publication Data

US 2005/0287435 A1 Dec. 29, 2005

(30) Foreign Application Priority Data

Jun. 25, 2004 (KR) ............... 10-2004-0048158

(51) Int. Cl.
*H01M 2/30* (2006.01)

(52) U.S. Cl. .................. 429/211; 429/178; 429/174

(58) Field of Classification Search ............. 429/174, 429/178, 211
See application file for complete search history.

(56) References Cited

U.S. PATENT DOCUMENTS 5,563,006 A * 10/1996 Von Benda et al. ......... 429/104

FOREIGN PATENT DOCUMENTS

| JP | 2000-149915 | 5/2000 |
|---|---|---|
| JP | 2000-150306 | 5/2000 |
| JP | 2001-093579 | 4/2001 |
| JP | 2004-213937 | 7/2004 |
| KR | 2005-0098318 | 10/2005 |

* cited by examiner

*Primary Examiner*—Tracy Dove
(74) *Attorney, Agent, or Firm*—Robert E. Bushnell, Esq.

(57) ABSTRACT

A secondary battery includes: an electrode assembly having a winding including a positive electrode, a negative electrode, and a separator interposed therebetween, the winding centered around a winding axis; a case adapted to receive the electrode assembly, the winding axis being parallel to a longitudinal axis of the case; and first and second cap assemblies adapted to respectively seal opposite ends of the case, the first and second cap assemblies respectively having positive and negative electrode terminals electrically coupled to the electrode assembly. The electrode assembly is adapted to respectively be connected to the first and second cap assemblies by parts of the electrode assembly not coated with active materials, the parts of the electrode assembly not coated with active materials being arranged at opposite ends of the electrode assembly perpendicular to the winding axis.

8 Claims, 5 Drawing Sheets

SECONDARY BATTERY

CLAIM OF PRIORITY

This application makes reference to, incorporates the same herein, and claims all benefits accruing under 35 U.S.C. §119 from an application for SECONDARY BATTERY earlier filed in the Korean Intellectual Property Office on 25 Jun. 2004 and there duly assigned Serial No. 10-2004-0048158.

BACKGROUND OF THE INVENTION

1. Field of the Invention

The present invention relates to a secondary battery, and more particularly, to an improved secondary battery having a simple structure.

2. Description of the Related Art

A secondary battery can be classified into two types according to its use and capacity: a battery with a small capacity (hereinafter, referred to as a small-sized battery consisting of one or several cells; and a battery with a large capacity (hereinafter, referred to as a large-sized battery) consisting of tens of cells.

Of these, a small-sized battery is used as a power source for compact electronic equipment, such as a cellular phone, a laptop computer, a camcorder, and so on, and a large-sized battery is used as a power source for a motor, such as a motor of a hybrid electric vehicle.

When a small-sized battery is composed of only one cell, it usually has a cylindrical or hexahedral shape, and is fabricated by interposing a separator as an insulator between band-shaped positive and negative electrodes, and then winding them together to form a spiral-shaped electrode assembly (as a jelly-roll configuration), and inserting the assembly into a cylindrical case.

Then, each lead terminal, i.e. a conductive tab electrically connected to each electrode of the battery, is respectively affixed to the positive and negative electrodes by welding.

However, the structure of a small-sized battery as fabricated above can not be directly applied to a large-sized battery because it does not satisfy the working properties of a large-sized battery in terms of capacity and output and needs to be improved in various ways to be fit for them.

There occurs another problem, that is, modifying the design of a small-sized battery to be fit for the working properties of a large-sized battery raises the manufacturing cost as its internal design becomes more complicated, thereby requiring more fabricating procedures and labor. For example, a case containing an electrode assembly is one of the main factors raising the production cost of a large-sized battery, because a case is usually made by using a die requiring high manufacturing cost.

Furthermore, a large-sized battery requires a particular structure to easily connect the battery cells, unlike a small-sized battery, because a large-sized battery uses tens of secondary battery cells. It also requires a high current collection efficiency to satisfy its working properties, such as a high output. Therefore, another factor in designing a successful large-sized battery depends on the connection between the electrode assembly and electrode terminals.

SUMMARY OF THE INVENTION

An aspect of the present invention is to provide an improved secondary battery having a simple structure based on the aforementioned description.

Another aspect of the present invention is to provide a secondary battery with better current collecting efficiency by improving the connection between the electrode assembly and electrode terminals.

In order to accomplish the aforementioned aspects, a secondary battery provided according to one embodiment of the present invention includes: an electrode assembly having a winding including a positive electrode, a negative electrode, and a separator interposed therebetween, the winding centered around a winding axis; a case adapted to receive the electrode assembly, the winding axis being parallel to a longitudinal axis of the case; and first and second cap assemblies adapted to respectively seal opposite ends of the case, the first and second cap assemblies respectively having positive and negative electrode terminals electrically coupled to the electrode assembly; wherein the electrode assembly is adapted to respectively be connected to the first and second cap assemblies by parts of the electrode assembly not coated with active materials, the parts of the electrode assembly not coated with active materials being arranged at opposite ends of the electrode assembly perpendicular to the winding axis.

The case preferably comprises openings arranged to oppose each other.

The secondary battery preferably further comprises current collecting plates adapted to be electrically connected to the parts of the electrode assembly not coated with active materials, the cap assemblies being adapted to be respectively electrically connected to the electrode assembly by the current collecting plates.

The current collecting plates preferably have a shape corresponding to that of a cross-section of the electrode assembly.

The electrode assembly is preferably adapted to be electrically connected to the cap assemblies by lead terminals arranged and fixed between the parts of the electrode assembly not coated with active materials.

The parts of the electrode assembly not coated with active materials are preferably closely adhered together into a unitary structure.

The cap assemblies preferably each comprise a plate-shaped base having an aperture therein and an electrode terminal mechanically affixed to the aperture and electrically insulated from the base by a gasket.

The electrode assembly preferably has a prismatic shape.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Exemplary embodiments of the present invention are described in detail below with reference to the accompanying drawings. However, the present invention is still open to other various possible embodiments and is not limited to the embodiments discussed herein.

Figure 1:
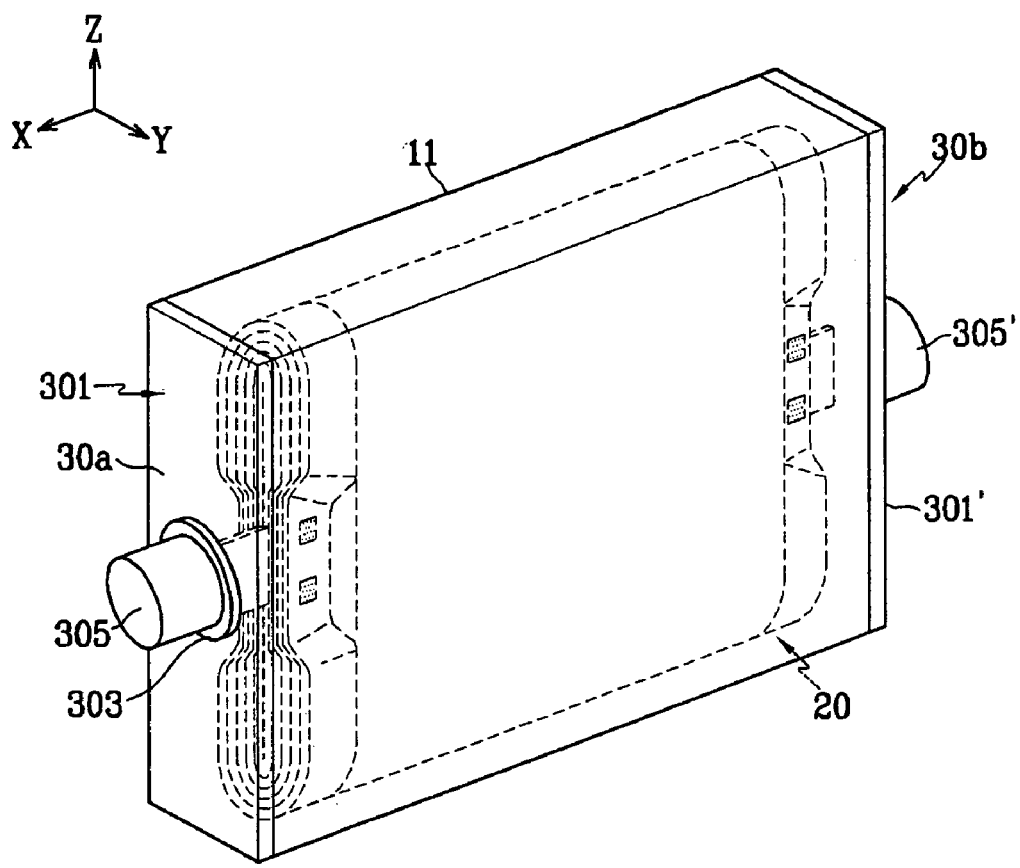
FIG. 1 is a perspective view of a secondary battery according to an embodiment of the present invention.
Figure 2:
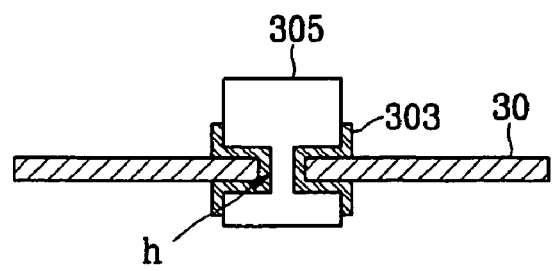
FIG. 2 is a schematic cross sectional view of a cap assembly according to an embodiment of the present invention.

FIG. 1 is a perspective view of a secondary battery according to one embodiment of the present invention. The secondary battery includes an electrode assembly 20 formed by winding a positive electrode 23, a negative electrode 24, and a separator 21 of an insulation material therebetween, these elements being inserted into a partly-open prismatic case 11 and the openings on both sides thereof then sealed with cap assemblies 30a and 30b.

The case 11 comprises a conductive material such as aluminum, an aluminum alloy, or nickel-plated steel. Its advantageous shape is a hexadron with openings 11a and 11b on both sides so that an electrode assembly can be inserted therein. However, the present invention is not limited thereto. The case illustrated as an example with reference to the accompanying drawings has a hexahedral shape, wherein the above openings 11a and 11b are arranged to oppose each other on both sides of the case 11 (X axis in the drawing), and accordingly, these two left and right openings in both sides are arranged to oppose each other; that is, the hexahedron has a longer width with the openings (X axis in the drawing) than length (Y axis in the drawing). The above fabrication method of the case 11 is advantageous because it can use an injection molding instead of a die, consequently lowering its manufacturing cost.

The electrode assembly 20 comprises: an electrode group 25, formed by winding a positive electrode 23, a negative electrode 22, and a separator 21 interposed therebetween; and two lead terminals 70 and 50 for the positive and negative electrodes optionally connected to parts 22b and 23b, not coated with active materials and formed at both ends of the electrode assembly perpendicular to the winding axis O. The electrode assembly 20 is inserted into the case 11 in the direction of the horizontal winding shaft O parallel to a longitudinal axis of the case 11. Accordingly, parts not coated with active materials 23b and 22b formed at both ends of the electrode group 25 are located toward each opening 11a and 11b. This electrode assembly 20 is described below in further detail using the accompanying drawings.

As shown in FIG. 1, a prismatic type of electrode assembly 20 contained within the case 11 is presented as an exemplary embodiment of the present invention. However, the present invention is not limited thereto.

As shown in FIG. 1, the cap assemblies 30a and 30b are respectively fixed to the openings 11a and 11b of the case 11 so that plate-shaped bases 301 and 301' sealing the case 11, and each electrode terminal 305 and 305' for the positive and negative electrodes, laid across the internal and external side of the can and penetrating the bases 301 and 301', can be fixed to the case 11 through the hole h, protruding outside. Gaskets 303 and 303' interposed between electrode terminals 305 and 305' and the case 11, insulate them as well as seal the hole. In addition, the cap assemblies 30a and 30b can further include a vent member (not shown) designed to rupture at optionally set pressures, emitting gases in order to prevent the battery from exploding.

Accordingly, a secondary battery of the present invention can easily form a battery module because it has electrode terminals 305 and 305' for the positive and negative electrodes at both right and left sides. That is, if tens of batteries are in series with each opposite electrode alternately linked, an electrode terminal with an opposite polarity also alternates at both sides. A battery pack is formed by fixing a connecting member to the above electrode terminals in series, and a battery module is also readily constituted by linking cooling equipment to remove generated heat and control equipment to this battery pack.

An electrode assembly connected to the aforementioned cap assemblies 30a and 30b is described below.

First, an electrode group 25 comprising a part of an electrode assembly, and then the electrode assembly formed by connecting lead terminals for the positive and negative electrodes into the electrode group 25, are described with reference to FIG. 3.

According to an embodiment of the present invention, an electrode group 25 is formed by winding a positive electrode 23, a negative electrode 22, and a separator 21 interposed therebetween, centering around the winding axis O. Parts that are not coated with an active material 23b and 22b are also formed at both ends of the electrode group 25 in the crossing direction with respect to the winding axis O.

In more detail, first, the positive and negative electrodes 23 and 22 are formed by coating each positive and negative active material 23a and 22a onto each current collector 231 and 221, and then, a prismatic electrode assembly is formed by pressing them with a machine, such as a press, after winding them like a jelly-roll centering around the winding axis O. That is to say, a prismatic electrode assembly is formed by pressing flat a cylindrical one, formed by winding a positive electrode, a negative electrode, and a separator interposed therebetween as an insulator (refer to FIG. 4).

Figure 3:
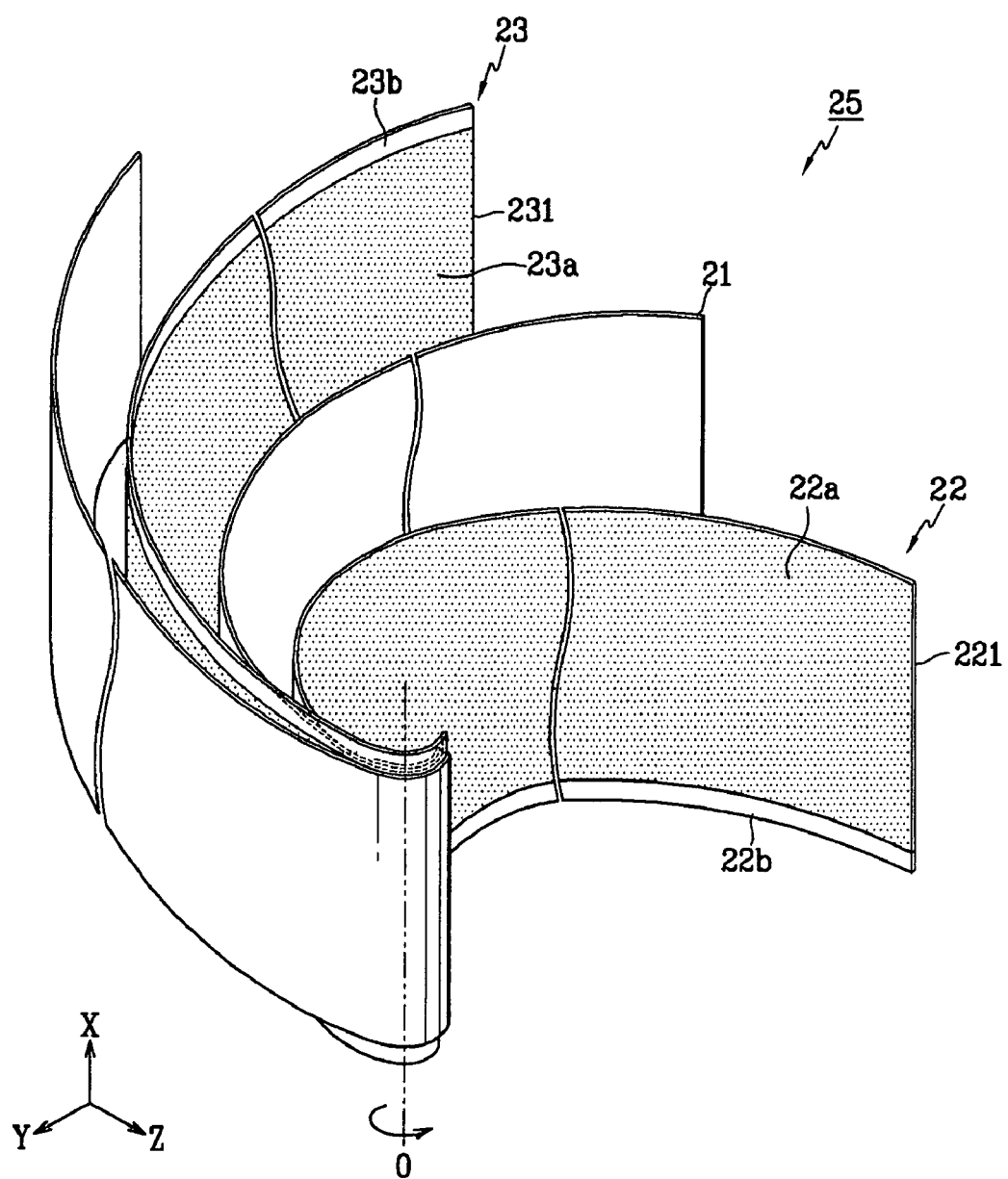
FIG. 3 is a perspective view of an electrode group according to an embodiment of the present invention.
Figure 4:
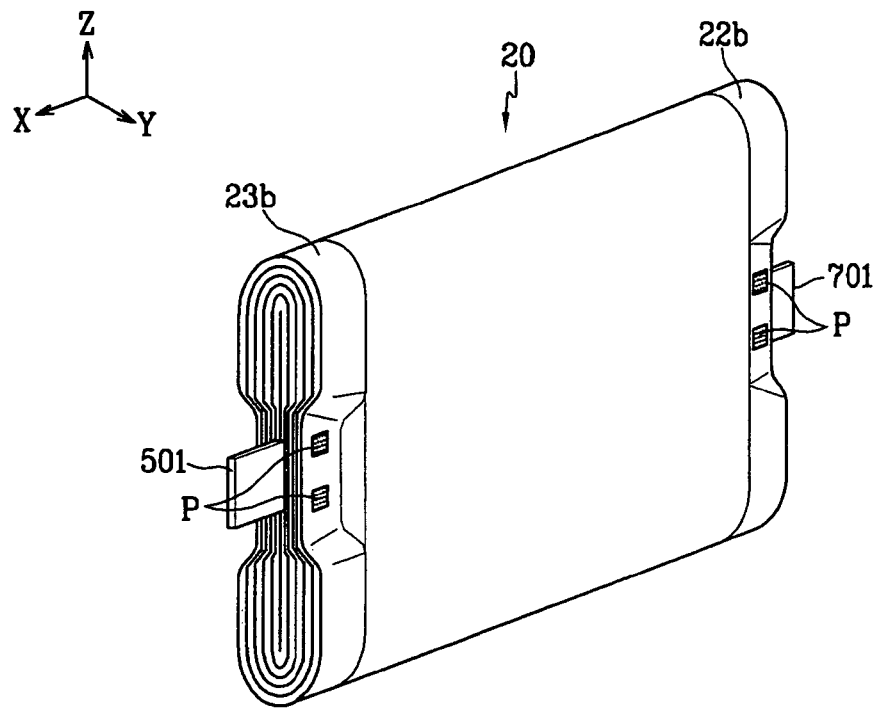
FIG. 4 is a perspective view of a prismatic electrode assembly according to an embodiment of the present invention.

On the other hand, a comparison of FIG. 3 with FIG. 4 shows the changed direction of a winding axis O; in other words, a winding axis in FIG. 3 is in the same direction as the Z axis, while a winding axis O in FIG. 4 is laid down in the same direction as the X axis. Therefore, a winding axis of an electrode assembly 20 in the present invention is horizontally formed rather than being vertically formed.

As an electrode assembly is formed so that the winding axis O is in the horizontal direction, un-coated parts 23b and 22b formed at both ends of the electrode assembly 20 are also placed in the horizontal direction. Accordingly, a left side of the electrode assembly 20 in the drawing is the un-coated part 23b for the positive electrode, while the right side is the un-coated part 22b for the negative electrode.

Then, each lead terminal for the positive and negative electrodes 501 and 701 is inserted inside the un-coated parts 23b and 22b, centered therein, and then fixed thereto at the welding points P by a resistance welding or an ultrasonic welding method.

Figure 5:
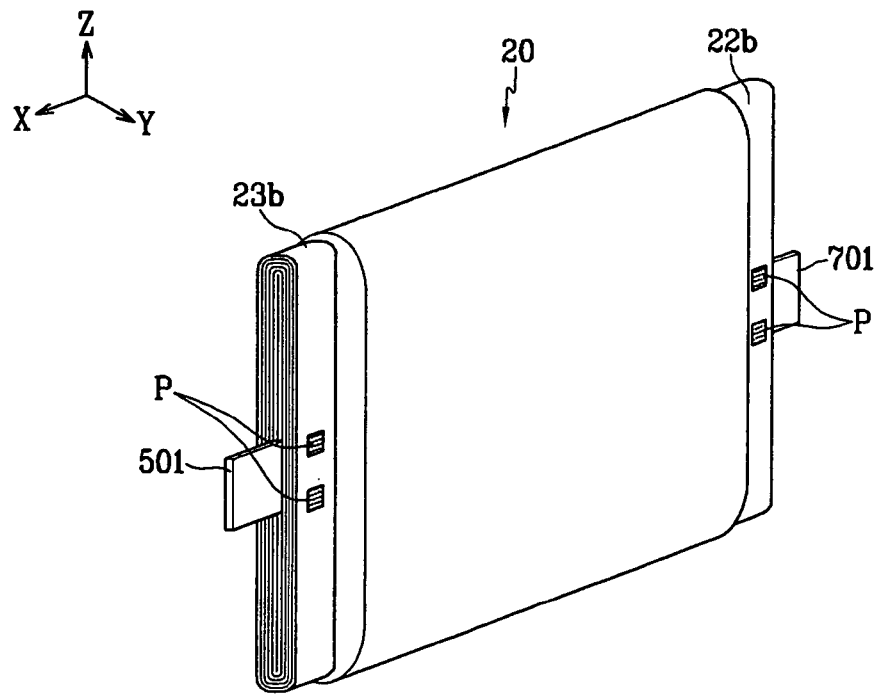
FIG. 5 is a perspective view of a prismatic electrode assembly according to another embodiment of the present invention.

FIG. 4 illustrates an embodiment where un-coated parts 23b and 22b are partly adhered only where lead terminals 501 and 701 are contacted. However, the present invention is not limited thereto. In other words, as shown in FIG. 5, un-coated parts 23b and 22b can be formed by closely adhering the entire un-coated part. Accordingly, the un-coated parts 23b and 22b result in having a rectangular plate shape wherein the width of an electrode assembly (X axis in the drawing) is shorter than its length in the direction of a winding axis of the electrodes (Z axis in the drawing).

As described above, according to the embodiment of the present invention, an electrode assembly 20 is completed by connecting lead terminals 501 and 701 to its un-coated parts 23b and 22b.

Figure 6:
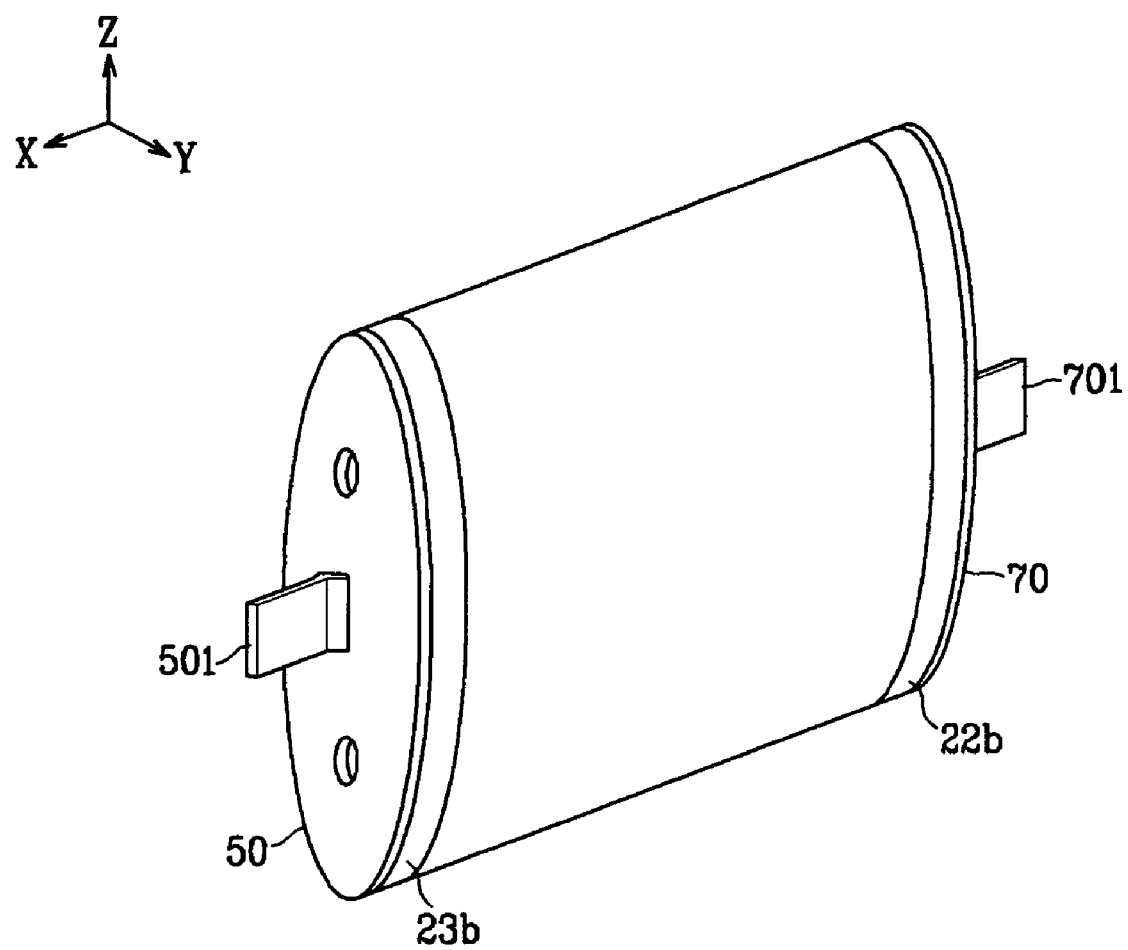
FIG. 6 is a perspective view of an electrode assembly according to the structure of a current collecting plate.

On the other hand, FIG. 6 illustrates an electrode assembly equipped with current collecting plates 50 and 70, according to another embodiment of the present invention.

This electrode assembly 20 includes the same electrode group 25 as that of FIG. 4 except for the current collecting plates 50 and 70 for increasing current collecting efficiency. However, this electrode assembly 20 can advantageously be formed relatively larger than the one presented in FIG. 4, supposing the same size of the case 11, because the width of its un-coated parts 23b and 22b can be formed relatively shorter than those of the one presented in FIG. 4. Therefore, it can advantageously raise energy density per unit volume.

According to this embodiment of the present invention, each current collecting plate 50 and 70 with the same shape as that of the cross-section of an electrode assembly 25 is respectively faced with un-coated parts 23b and 22b and fixed thereto by direct laser welding. Then, the external sides of the current collecting plates 50 and 70 are equipped with the electrode terminals 305 and 305' and lead terminals 501 and 701 having the same polarity as the electrode terminals respectively connected thereto. An aperture h for the injection of an electrolyte can be additionally formed on the current collecting plates 50 and 70.

Alternatively, these current collecting plates can be modified to have another structure comprising several elements extending like branches.

An electrode assembly 20 formed according to embodiments of the present invention is inserted in the direction of a winding axis O parallel to a longitudinal axis of the case 11.

Figure 7:
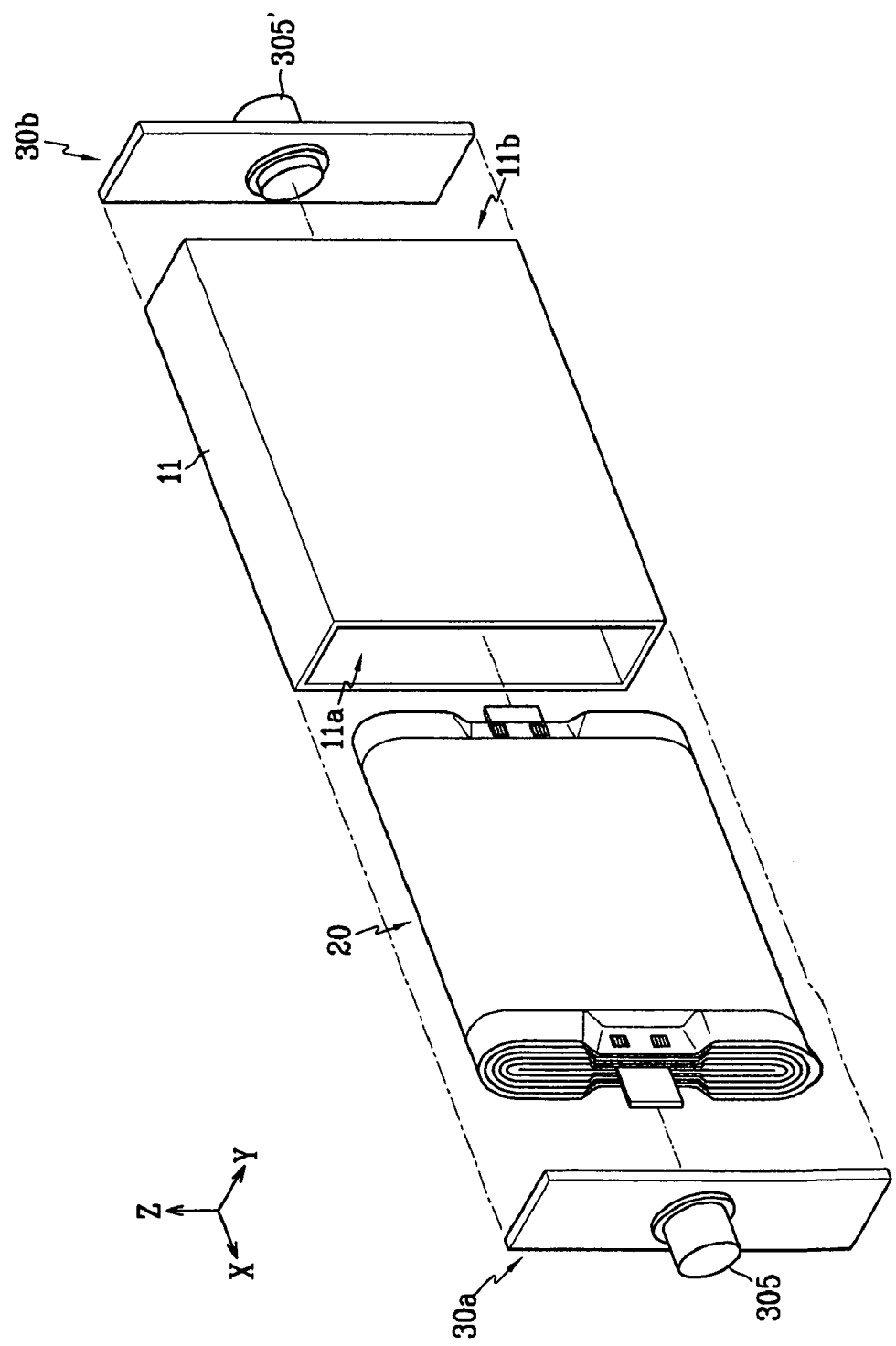
FIG. 7 is an exploded perspective view of an electrode assembly according to an embodiment of the present invention.

With reference to FIG. 7, an electrode assembly 20 formed as in FIG. 4 is inserted into the empty space of the case 11 and fixed therein so that its winding axis O is perpendicular to the openings 11a and 11b to arranged to oppose each other each other. Accordingly, each lead terminal 501 and 701 for the positive and negative electrodes projects out of each opening 11a and 11b in the above electrode assembly.

An electrode terminal 305 equipped with a cap assembly 30a is electrically connected to a lead terminal 501 with the same polarity. That is to say, the positive electrode terminal is connected to the positive lead terminal. Then, the base 301 of cap assembly 30a is fixed to the case 11 by laser welding.

Then, the case 11 is erected with one opening 11b up, through which an electrolyte can be injected thereinto to impregnate the electrodes. Finally, a secondary battery according to embodiments of the present invention is completed by welding and fixing the cap assembly 30b to the case 11 with an electrode terminal 501' connected to a lead terminal 701 for a negative electrode, in the same method as a cap assembly for the positive electrode 30a is attached to the case 11.

According to embodiments of the present invention, a secondary battery can have a lower manufacturing cost due to its simple structure and subsequently, the decreased number of parts. Furthermore, a case of a secondary battery of the present invention can be fabricated by injection molding without a transfer die, which also contributes to lowering the manufacturing cost.

In addition, the present invention has an effect on making an easier connection among batteries by arranging electrode terminals opposing to each other in series.

The secondary battery may be useful as an energy source for driving a motor which is used for Hybrid Electric Vehicles (HEVs), Electric Vehicles (EVs), cordless vacuum cleaners, motorbikes, motor scooters, and the like, which require high power performance.

While the present invention has been described in detail with reference to the exemplary embodiments, those skilled in the art will appreciate that various modifications and substitutions can be made thereto without departing from the spirit and scope of the present invention as set forth in the appended claims.

What is claimed is:

1. A secondary battery, comprising an electrode assembly having a winding including a positive electrode, a negative electrode, and a separator therebetween, the winding centered around a winding axis;
   a case receiving the electrode assembly, the winding axis being parallel to a longitudinal axis of the case; and
   first and second cap assemblies respectively sealing opposite ends of the case, the first and second cap assemblies respectively having positive and negative electrode terminals electrically coupled to the electrode assembly by respective lead terminal portions;
   wherein uncoated parts of the electrode assembly are arranged at opposite ends of the electrode assembly perpendicular to the winding axis;
   wherein the uncoated parts are welded together and directly respectively welded to the lead terminal portions of the positive and negative electrode terminals;
   wherein the electrode assembly is electrically connected to the cap assemblies by the lead terminal portions of the positive and negative electrode terminals arranged and fixed between the uncoated parts of the electrode assembly;
   wherein the uncoated parts of the electrode assembly are not coated with active materials and are closely adhered together into a unitary structure; and
   wherein a plurality of weld point penetrates through said uncoated parts of the electrode assembly to affix the lead terminal portions of the positive and negative electrode terminals to said uncoated parts of the electrode assembly.

2. The secondary battery of claim 1, wherein the case comprises openings arranged to oppose each other.

3. The secondary battery of claim 1, wherein the cap assemblies are respectively electrically connected to the electrode assembly by the lead terminal portions of the positive and negative electrode terminals.

4. The secondary battery of claim 3, wherein the positive and negative electrode terminals have a shape corresponding to that of a cross-section of the electrode assembly.

5. The secondary battery of claim 1, wherein the cap assemblies each comprise a plate-shaped base having an aperture therein and an electrode terminal mechanically affixed to the aperture and electrically insulated from the case by a gasket.

6. The secondary battery of claim 1, wherein the electrode assembly has a prismatic shape.

7. The secondary battery of the claim 1, wherein the lead terminal portions of the positive and negative electrode terminals are arranged inside the uncoated parts of the electrode assembly.

8. The secondary battery of the claim 1, wherein the lead terminal portions of the positive and negative electrode terminals are arranged outside the uncoated parts of the electrode assembly.

* * * * *